United States Patent [19]

Scheffler

[11] Patent Number: 5,547,128
[45] Date of Patent: Aug. 20, 1996

[54] SPRAYER

[75] Inventor: Edward D. Scheffler, Labelle, Fla.

[73] Assignee: Jack M. Berry Inc., LaBelle, Fla.

[21] Appl. No.: 252,315

[22] Filed: Jun. 1, 1994

[51] Int. Cl.$^6$ .................................................. B05B 9/06
[52] U.S. Cl. .......................... 239/77; 239/163; 239/172; 239/399; 47/1.01; 47/1.5
[58] Field of Search ..................... 239/77, 78, 147, 239/172, 175, 399, 400, 419.3, 163, 170; 47/1.01, 1 M, 1.5, 1.7

[56] References Cited

U.S. PATENT DOCUMENTS

| | | | |
|---|---|---|---|
| 1,777,799 | 4/1916 | Patterson | 239/172 |
| 2,620,230 | 12/1952 | Hait | 239/78 |
| 2,686,990 | 8/1954 | Matthews | 47/58 |
| 2,754,151 | 7/1956 | Williamson | 239/164 |
| 2,770,069 | 11/1956 | Bowie | 239/78 |
| 2,841,229 | 7/1958 | Guise | 239/170 |
| 2,899,138 | 8/1959 | Williamson | 239/163 |
| 2,925,222 | 2/1960 | Spreng | 239/172 |
| 3,111,268 | 11/1963 | Butler | 239/170 |
| 3,216,664 | 11/1965 | Wolford et al. | 239/172 |
| 3,335,943 | 8/1967 | Sorrenti | 239/77 |
| 3,490,695 | 1/1970 | Rittenhouse | 239/77 |
| 3,774,845 | 11/1973 | Folkert | 239/78 |
| 3,848,635 | 11/1974 | Scheffler, Jr. | 137/610 |
| 4,252,274 | 2/1981 | Kubacak | 239/163 |
| 4,481,894 | 11/1984 | Brenn | 239/163 |
| 4,666,089 | 5/1987 | Inculet | 239/77 |
| 4,723,709 | 2/1988 | Curran, Jr. et al. | 239/110 |
| 4,813,604 | 3/1989 | Curran, Jr. | 239/163 |
| 4,823,268 | 4/1989 | Giles et al. | 239/77 |
| 5,167,369 | 12/1992 | Kubacek | 239/102.1 |
| 5,215,255 | 6/1993 | Kubacek et al. | 239/164 |
| 5,278,423 | 1/1994 | Wangler et al. | 47/1.7 |
| 5,284,297 | 2/1994 | Kubacek et al. | 239/102.1 |
| 5,326,030 | 7/1994 | Benest | 239/164 |

OTHER PUBLICATIONS

Brochure for FMC M–452 PTO Sprayers (two pages; undated).
Brochure for FMC Tractor Mounted PTO Driven DP 15 3pt 100 Air Sprayer (two pages; undated).
Brochure of FMC Entitled "Our Newest Modular PTO–Driven Orchard Air Sprayers" (four pages; copyright 1988).
Brochure of Durand–Wayland, Inc. Entitled "Streamliner" (four pages; undated).
Brochure for Berthoud Super Arbo BX 2000 (two pages; undated).
Brochure for Berthoud C–400 Super Airflo Cannon (two pages; undated).
Brochure for Berthoud Arbo AX Series (two pages; undated).
Brochure of Berthoud Skibbe, Inc. Entitled "Berthoud the World's Leader in air blast sprayers" (two pages; bearing printer's notation suggesting Oct. 1988).
Brochure for FMC Speed Sprayer (two pages; bearing notation suggestion 1990).
Brochure for U.S. Sprayer PT–38 (two pages; undated).

*Primary Examiner*—Andres Kashnikow
*Assistant Examiner*—Lisa Douglas
*Attorney, Agent, or Firm*—Dean W. Russell; Kilpatrick & Cody

[57] ABSTRACT

Apparatus and methods for spraying fluids are disclosed. Multiple distinctive airflows are used sequentially to create eddy currents at and near the outer canopies of vegetation. Such currents promote uniform chemical coverage of fruit and foliage throughout the vegetation. Nozzles adapted for selective use and adjustment independently and in multiple directions and planes also enhance coverage, particularly when fruit and foliage is especially dense or sparse or close to or remote from the ground.

8 Claims, 7 Drawing Sheets

FIG. 12

SPRAYER

This invention relates to apparatus and methods for spraying fluids and more particularly to an agricultural sprayer adapted to provide more uniform coverage for tree-borne fruit and foliage.

BACKGROUND OF THE INVENTION

Insects and disease can insidiously damage or destroy vegetation, including, for example, grapefruit, oranges, and other citrus fruits. To minimize the effects of such plagues, fruit trees are frequently treated with fungicides, pesticides, and other chemicals of varying types. If grown in groves, the trees are often treated using existing commercial sprayers, which can be hitched to tractors and passed between rows of trees in a grove. Spraying chemicals from both the left and right sides of the sprayer permits it to treat concurrently at least portions of trees in two adjacent rows.

Existing agricultural sprayers do not uniformly treat exposed surfaces of fruits and foliage, however. Many such commercial sprayers include only a single opening or an air stream per side and provide solely high volume air as a fluid propellant. Generally, therefore, if these sprayers travel at high speeds, they inadequately supply the inner canopies of the vegetation, leaving such areas vulnerable to pests and disease. Conversely, slow travel through vegetation typically sacrifices uniform coverage of the outer foliage. In either event, the high volume air used by these sprayers typically causes the chemical spray to contact exposed sides of the fruit near the outer canopies and continue through the trees, precluding the spray from covering the rear (non-exposed) surfaces of the fruit.

U.S. Pat. No. 2,686,990 to Matthews, incorporated herein in its entirety by this reference, discloses another horticultural sprayer. Unlike sprayers currently in commercial use, the sprayer disclosed in the Matthews patent purportedly attempts to provide coverage for the rears of leaves and twigs. To do so the sprayer uses duplicate blowers and associated nozzles angled "so that the blasts of air emanating from these nozzles will be directed in converging paths meeting with each other either laterally or vertically of the vehicle, as the case may be." According to the Matthews patent, these converging blasts bend tree branches alternately clockwise and counterclockwise (or vice-versa) as the vehicle passes, allegedly to deposit spraying material uniformly on the surfaces of the foliage.

Although the nozzles disclosed in the Matthews patent can be tilted upwardly for taller foliage or rotated to either side of the apparatus especially for smaller trees, they cannot otherwise be adjusted to avoid disturbing the required angular convergence of the air streams. The interdependent air streams themselves, moreover, are both of the same velocity to penetrate and converge at the center (i.e. trunk) of each tree, as shown in FIG. 8 of the Matthews patent. As a result, the apparatus of the Matthews patent neither supplies multiple streams of differing velocities and volumes nor creates eddy currents at the outer canopies of trees.

SUMMARY OF THE INVENTION

The present invention, by contrast, utilizes multiple distinctive airflows to create such eddy currents at and near the outer canopies. By sequentially supplying high velocity air streams at low volume and low velocity streams at high volume from both sides of the apparatus, the present invention promotes uniform spray coverage of fruit and foliage throughout approximately two-thirds of each tree of two adjacent rows with a single pass. The invention is particularly advantageous for spraying fruit growing near the outer canopies of the trees as, unlike in existing sprayers, the prevailing currents tend to wrap the sprayed chemicals completely around such fruit. It nonetheless is effective for spraying fruit and foliage elsewhere in the trees as well, enhancing its usefulness for numerous types and sizes of vegetation.

Lacking restrictive angled spray requirements, the present invention includes nozzles capable of being adjusted independently and in multiple directions and planes. Switching circuitry and bifurcated ductwork associated with the invention also permits selected nozzles or banks to be occluded when desired, minimizing waste when foliage and fruit are concentrated either close to or substantially distant from the ground. Unlike the conventional nozzles shown in the Matthews patent, additionally, those of the present invention are both pre-metered and of non-rectangular shape, employing multiple orifices and vacuum-shear technology to supply chemicals from an appropriate tank.

Chemical agitation equipment is also included within the scope of the present invention, as is the assembly used for providing low velocity, high volume air streams. The mushroom-shaped chemical tank of the invention includes an unobstructed hydraulic fluid line directed to the lowermost portion of the tank, for example, and positions solenoid-controlled or other suitable valves elsewhere. Consequently, mixing always occurs at the bottom of the tank (where such mixing is needed to reduce sediment buildup), but only selectively elsewhere. The impeller and deflector assembly of the present invention, moreover, efficiently propels air at low velocity and high volume. Its position near the rear of the sprayer furnishes an intermediate portion of the sequential spraying, promoting the more uniform coverage of fruit and foliage desired to be achieved.

It is therefore an object of the present invention to provide an apparatus and methods for spraying vegetation.

It is also an object of the present invention to provide a sprayer adapted to provide more uniform coverage for tree-borne fruit and foliage than existing commercial devices.

It is another object of the present invention to provide a sprayer supplying both high velocity, low volume and low velocity, high volume air streams to fruit and foliage.

It is yet another object of the present invention to provide such air streams sequentially and on both sides of the vehicle.

It is a further object of the invention to provide a mechanism for spraying vegetation in which eddy currents at and near the outer canopies tend to wrap the sprayed chemicals completely around the vegetation present there.

It is another object of the present invention to provide nozzles adjustable both independently and in multiple directions and planes.

It is also an object of the present invention to provide mechanisms for improving spraying efficiency, including both selectively occludable nozzle banks and impeller and deflector assemblies for propelling air at low velocity and high volume.

It is a further object of the present invention to provide a system for agitating the chemicals in a tank having both an unobstructed hydraulic fluid line directed to a portion of the tank and obstructable lines directed elsewhere.

Other objects, features, and advantages of the present invention will become apparent with reference to the

DETAILED DESCRIPTION

Figure 1:
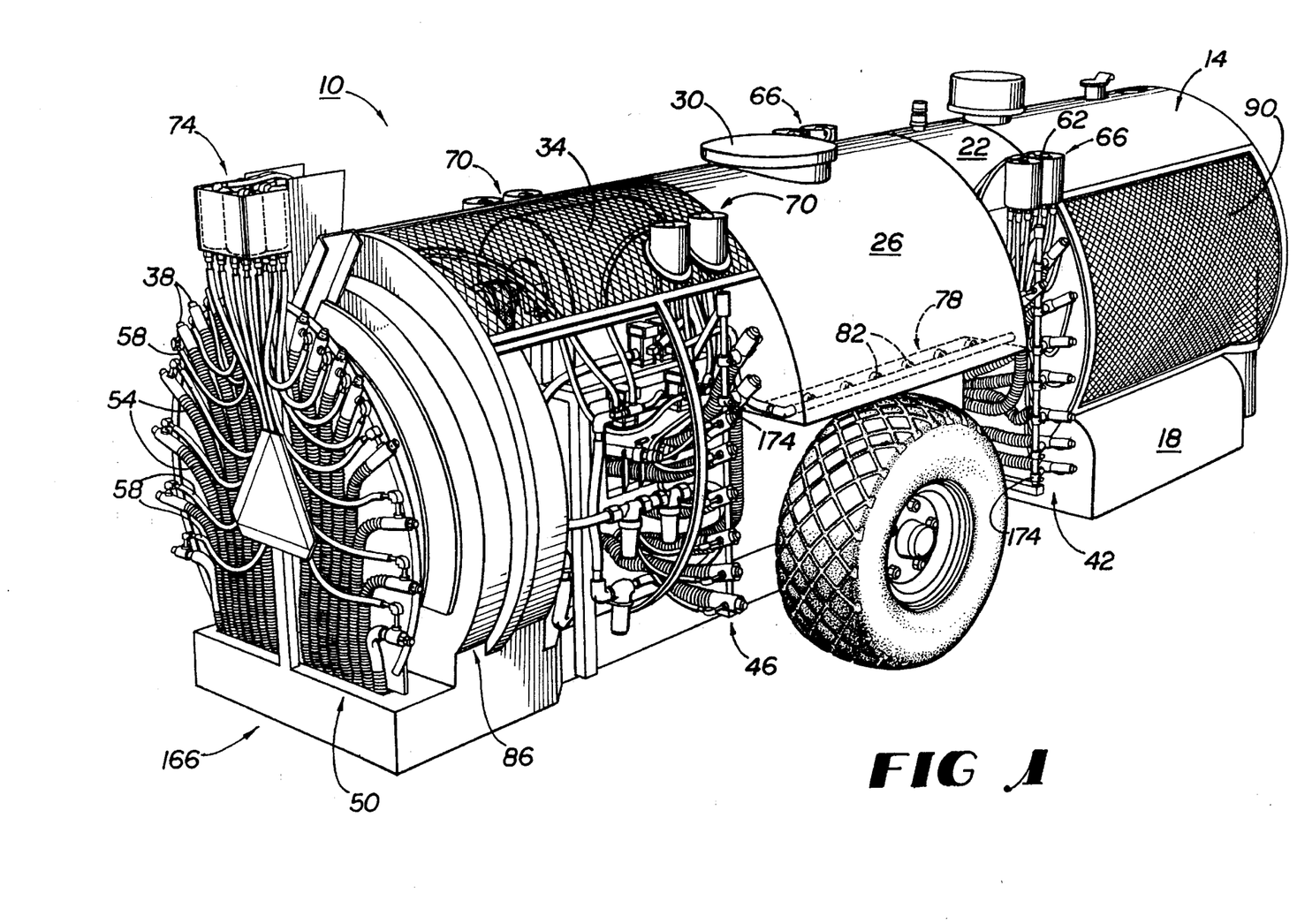
FIG. 1 is a perspective view of a sprayer of the present invention.
Figure 2:
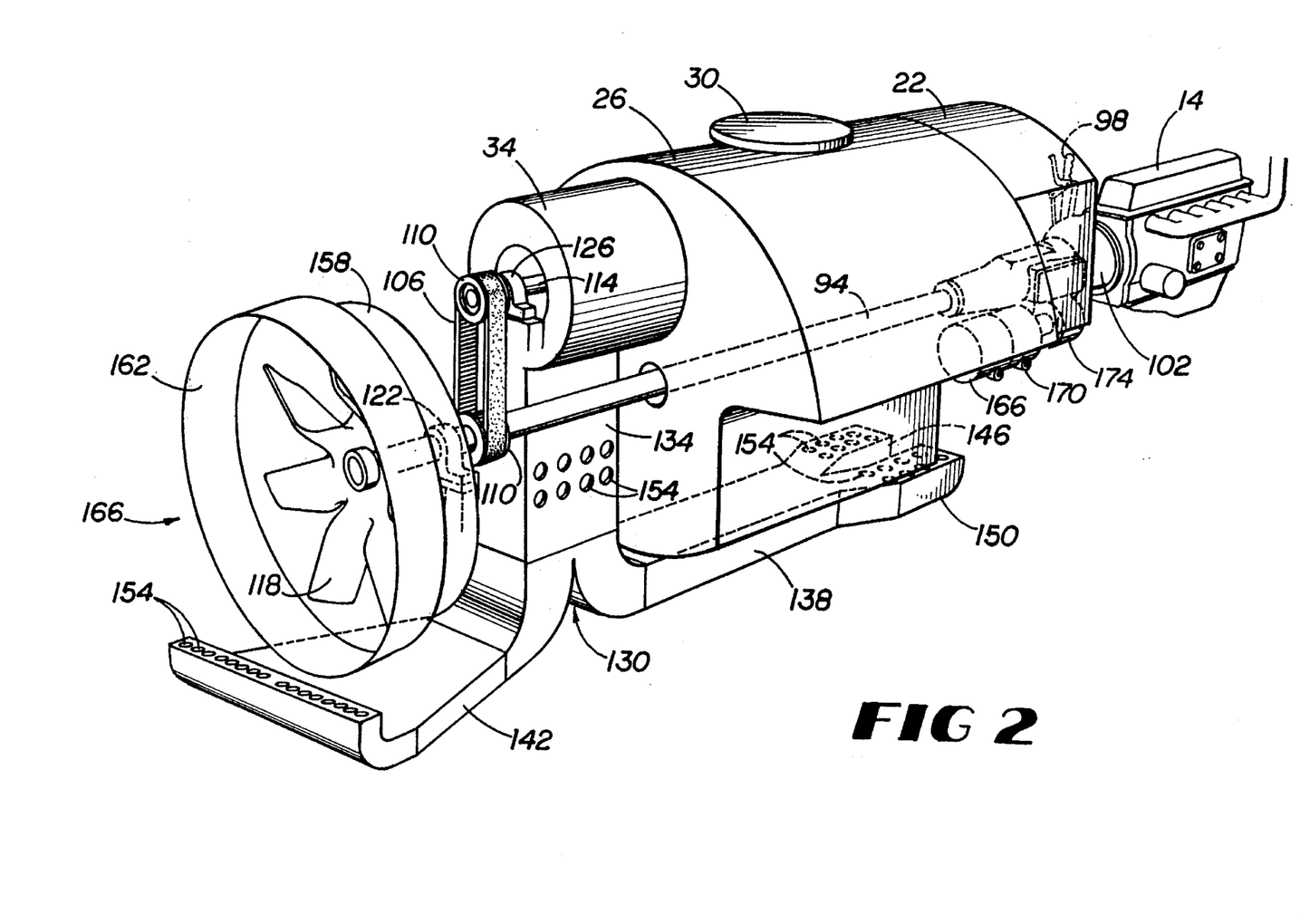
FIG. 2 is a partially cut-away view of the sprayer of FIG. 1.

FIGS. 1–2 illustrate sprayer 10 of the present invention. As shown principally in FIG. 1, sprayer 10 is adapted to be hitched to a tractor or other vehicle for movement throughout an orchard, grove, or other area in which vegetation grows. Sprayer 10 may include its own power supply, however, such as a gasoline or diesel engine 14 together with fuel tank 18. Also illustrated in FIGS. 1–2 are reservoir 22 (for hydraulic fluid), tank 26 (for chemicals) and its associated cap 30, and a squirrel-cage or other suitable blower 34 (for pressurized air). Combined, these components supply the fluids primarily used during the operation Of sprayer 10.

Connected to blower 34 and tank 26 are nozzles 38. Using air as the propellant, nozzles 38 discharge pesticides, insecticides, fungicides, or other fluids from tank 26 onto the vegetation for protection from pestilence and disease. As shown in FIG. 1, nozzles 38 are divided into fore, middle, and aft banks 42, 46, and 50, respectively, which are spaced along the length of sprayer 10. Each bank 42, 46, and 50 nominally consists of sixteen nozzles 38, eight associated with each of the left and right sides of sprayer 10. Those skilled in the art will recognize that other quantities and combinations of nozzles 38 may be employed, however, depending upon the results sought to be achieved. FIG. 1 additionally details flexible hoses 54 and 58 variously used with sprayer 10, with flexible hoses 54 providing pressurized air from blower 34 and hoses 58 supplying chemicals from tank 26.

Sprayer 10 of the present invention may additionally include metering cups 62 interposed between tank 26 and nozzles 38. Like nozzles 38, cups 62 are divided into respective fore, middle, and aft sets 66, 70, and 74 spaced along both the left and right sides of sprayer 10, with each set connected via hoses 58 to a corresponding bank of nozzles 38. In embodiments of sprayer 10 consistent with FIG. 1, each cup 62 supplies chemicals or other suitable fluids to four nozzles 38.

Additionally illustrated in FIG. 1 are manifold 78 with associated internal nozzles 82 and impeller assembly 86. Manifold 78, positioned within tank 26, assists in circulating chemicals through the tank 26. Impeller assembly 86, by contrast, is designed to impinge upon the vegetation high volumes of air travelling at low velocity, thereby creating eddy currents within the vegetation between treatments of high velocity air from nozzles 38. Screens 90, finally, may be used if desired to protect components of sprayer 10 (such as engine 14 and blower 34) from foreign matter and debris.

FIG. 2 details internal portions of sprayer 10, including shaft 94, a power take-off from engine 14. Connected to engine 14 through clutch 98 and clutch housing 102, shaft 94 provides power to both blower 34 and impeller assembly 86. Belt 106 fitted to sheaves 110 couples shaft 94 to fan shaft 114 of blower 34, for example, while shaft 94 connects directly to impeller blade 118 of impeller assembly 86. Pillow blocks 122 and 126 support shaft 94 and fan shaft 114, respectively.

Attached to blower 34 is ductwork 130, which comprises a middle plenum 134 and is bifurcated to form fore and aft plenums 138 and 142. Fore plenum 138 itself is bifurcated, forming separate left and right ends 146 and 150. As shown in FIG. 2, each plenum 134, 138, 142 defines sixteen openings 154, to which a corresponding number of flexible hoses 54 may be attached to convey pressurized air to nozzles 38. Openings 154 of middle plenum 134 supply air to middle bank 46, while those of aft plenum 142 furnish air to aft bank 50. The openings 154 of fore plenum 138, although divided between left and right ends 146 and 150, similarly provide air to the fore bank 42.

Also detailed in FIG. 2 is impeller assembly 86, which includes shroud 158 and deflector baffle 162 in addition to impeller blade 118. Hydraulic pumps 166 and 170 appear in FIG. 2 as well, each connected to engine 14. Together, the components illustrated in FIGS. 1–2 form an embodiment of sprayer 10 capable of sequentially discharging high velocity air streams at low volume and low velocity streams at high volume from both sides of the apparatus. To facilitate operation of sprayer 10, mounts 174 permit each nozzle 38 to be adjusted independently and both vertically and horizontally, thereby permitting nozzles 38 to be positioned in multiple directions and planes.

Figures 3, 4:
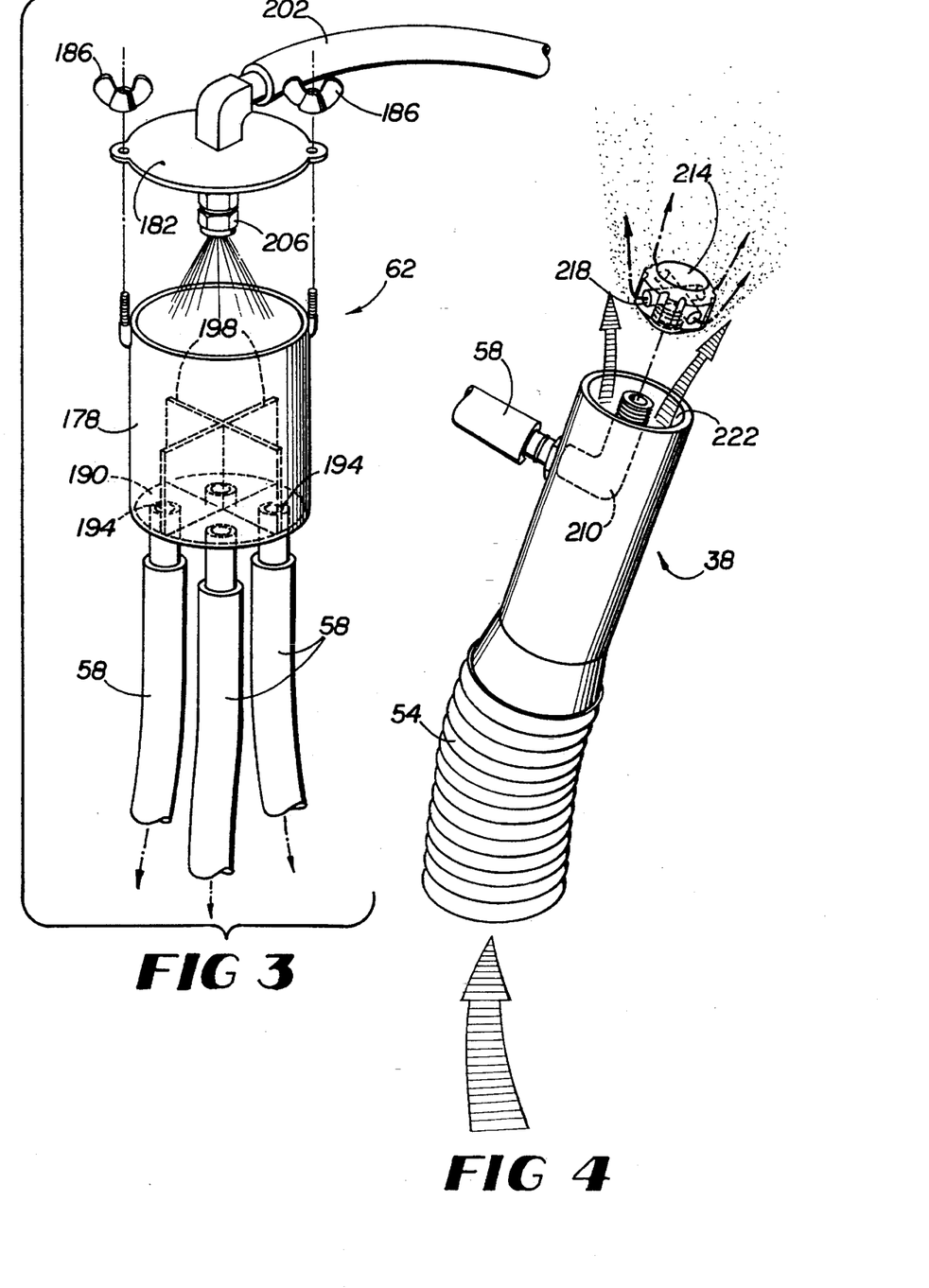
FIGS. 3–4 are exploded perspective views of a nozzle assembly forming part of the sprayer of FIG. 1.

FIG. 3 details cup 62, used to meter chemicals transferred from tank 26. Cup 62 comprises a generally cylindrical container 178 to which cover 182 may be attached using removable fasteners such as wing nuts 186. Cup 62 also includes a bottom 190, shown in FIG. 3 as having four openings 194 for receiving an equal number of hoses 58. Either connected (e.g. welded) to or integrally formed with bottom 190 is cruciform plate 198. Plate 198 divides the fluid from tank 26 received in cup 62 into four approximately uniform portions for discharge through hoses 58. As shown in FIG. 3, the fluid from tank 26 is conveyed to cup 62 by hose 202, which connects to a "tee-jet" or other nozzle 206 penetrating cover 182 and suitable for spraying fluid in a substantially conical pattern.

FIG. 4 details a nozzle 38 of sprayer 10. Utilizing vacuum-shear, or venturi, principles, nozzle 38 combines pressurized air in flexible hose 54 with fluids from hose 58 for discharge onto vegetation. Hose 58 terminates at nozzle 38 with elbow 210, which conveys fluid from tank 26 to orifice assembly 214 for emission. Orifice assembly 214 comprises multiple orifices 218 spaced uniformly about its circumference and is centrally positioned within tube 222 of nozzle 38. As a result, pressurized air from flexible hose 54 circumscribes orifice assembly 214, promoting relatively uniform concentrations of chemicals from tank 26 in each volume of emitted fluids.

The coverage achieved through use of sprayer 10 is detailed in FIGS. 5–9. Because the manner in which fluids are discharged on the left and right sides 226 and 230 of sprayer 10 is substantially identical, for simplicity FIGS. 5–9 only illustrate those emitted from the right side 230 of sprayer 10. Throughout FIGS. 5–8, sprayer 10 travels in the direction shown by arrow 234.

Figure 5:
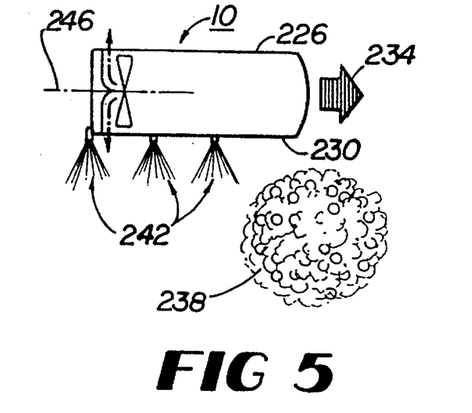
FIGS. 5–9 are diagrammatic views of operation of the sprayer of FIG. 1.
Figure 6:
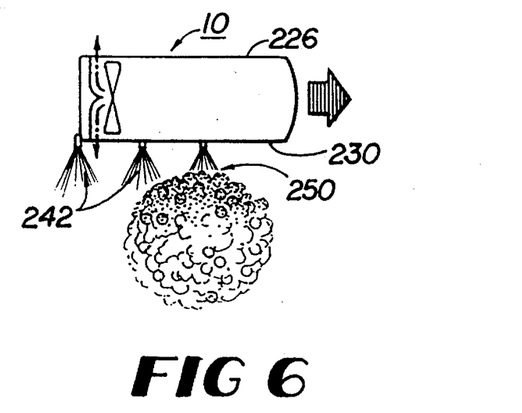
Figure 7:
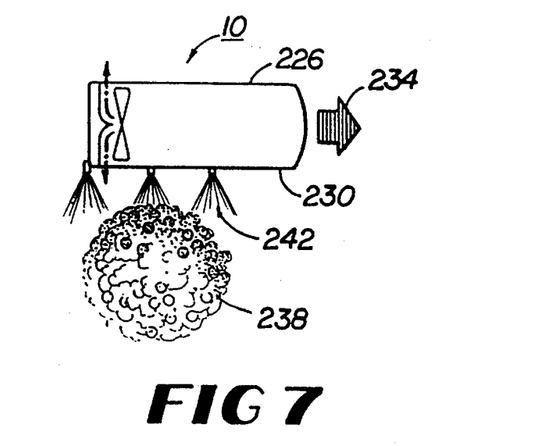

In operation, sprayer 10 approaches vegetation, such as tree 238, typically passing between rows of adjacent vegetation in a grove, orchard, or other area. As shown in FIG. 5, tree 238 is initially either untreated or requires additional treatment. Sprayer 10 then passes tree 238, spraying fluid 242 (consisting of air and chemicals) onto the tree 238 from each of fore and middle banks 42 and 46 of nozzles 38 (FIGS. 6–7). Because nozzles 38 are adjustable, fore and middle banks 42 and 46 may be directed to provide the converging blasts described in the Matthews patent. Alternatively, for example, nozzles 38 may be positioned substantially perpendicular to the longitudinal axis 246 of sprayer 10, as illustrated in FIGS. 6–7. In any event, fore and middle banks 42 and 46 provide low volumes of high velocity air streams to propel fluid 242 onto at least portions of the fruit and foliage of the outer canopy 250 of tree 238. As a result, some of the volume of chemicals included as part of fluid 242 adheres to the fruit and foliage of the outer canopy 250, while most of the balance remains suspended in the atmosphere between such fruit and foliage.

Figure 8:
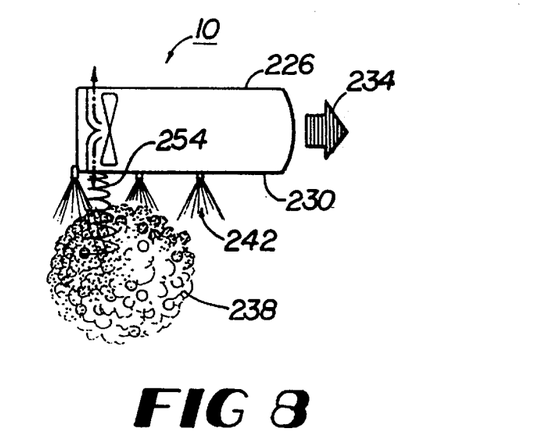
Figure 9:
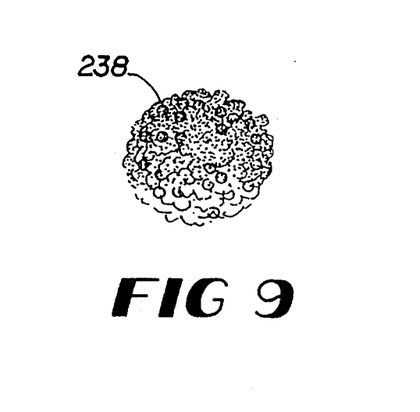

Following receipt of fluid 242, tree 238 is impacted both by air 254 supplied by impeller assembly 86 and then by additional fluid 242 from aft bank 50 (FIG. 8). Air 254, discharged at high volumes and low velocity and so as to swirl, creates eddy currents that tend to wrap around the rears of the fruit and foliage some of the balance of the chemicals of fluid 242 suspended in the interstitial atmosphere of outer canopy 250. Additional chemical-laden fluid 242 from aft bank 50 follows air 254, propelling the remainder of the suspended volume along with further chemicals into much of the remainder of tree 238. One pass by sprayer 10, consequently, is designed to provide uniform spray coverage of fruit and foliage throughout approximately two-thirds of tree 238 (FIG. 9). Of course, sprayer 10 concurrently covers a tree of the row adjacent left side 226, providing dual-sided coverage with a single pass.

Figure 10:
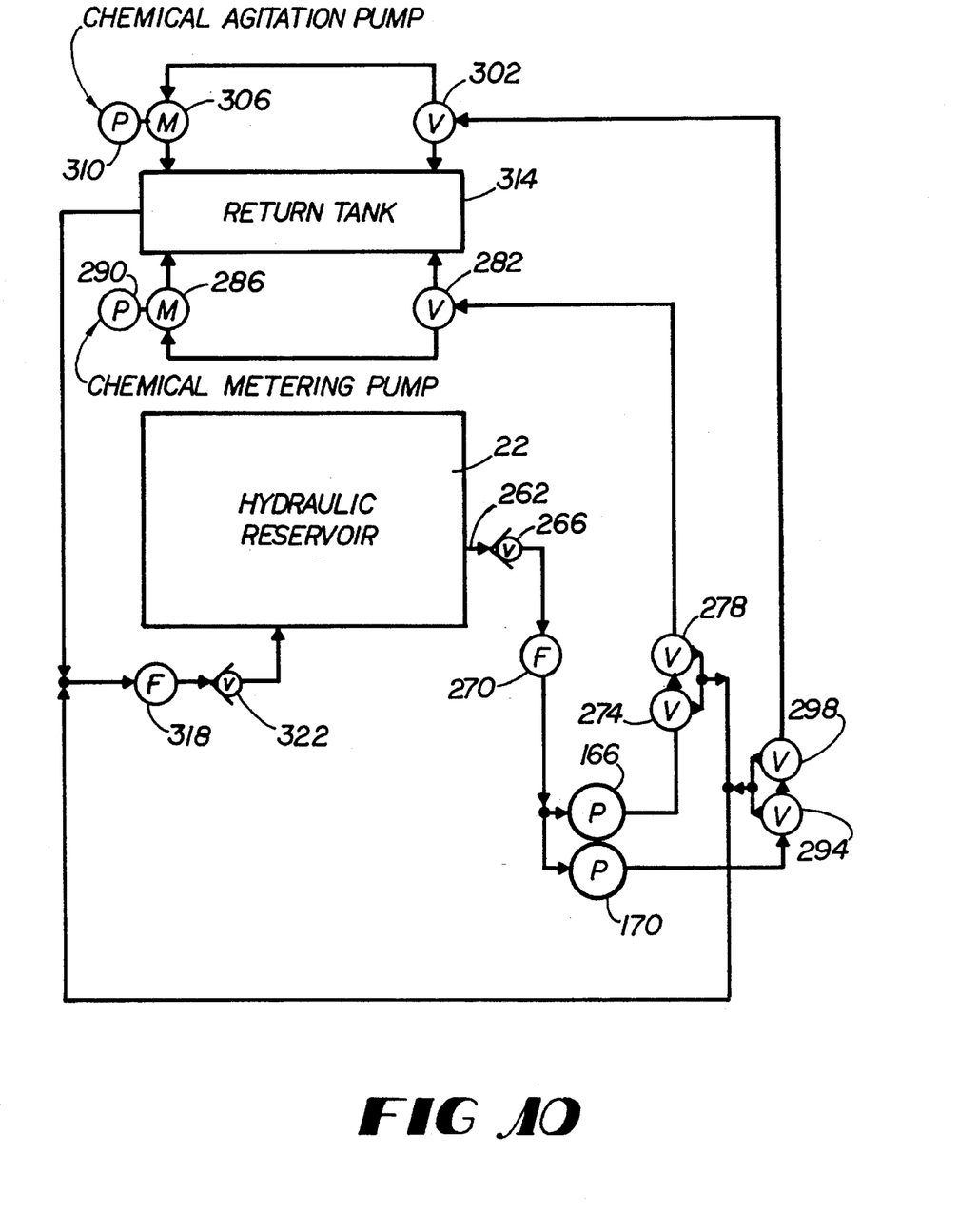
FIG. 10 is a schematic representation of the flow of hydraulic fluid through the sprayer of FIG. 1.

FIG. 10 presents a schematic representation of the general hydraulic system 258 of sprayer 10. Hydraulic fluid 262 from reservoir 22 flows to pumps 166 and 170 via check valve 266 and filter 270. Fluid 262 exiting pump 166 then travels through pressure relief valve 274, flow control valve 278, and a variable speed control valve 282 to motor 286, which powers metering pump 290. Fluid 262 from pump 170 follows an analogous path, passing through pressure relief valve 294, flow control valve 298, and a variable speed control valve 302 to motor 306, which powers agitation pump 310. Fluid 262 exiting motors 286 and 306 may accumulate in tank 314 (as may any fluid 262 redirected by valves 282 and 302) and thereafter return to reservoir 22 via filter 318 and check valve 322. Similarly, valves 274, 278, 294, and 298 may redirect fluid 262 to reservoir 22 when necessary or desired.

Figure 11:
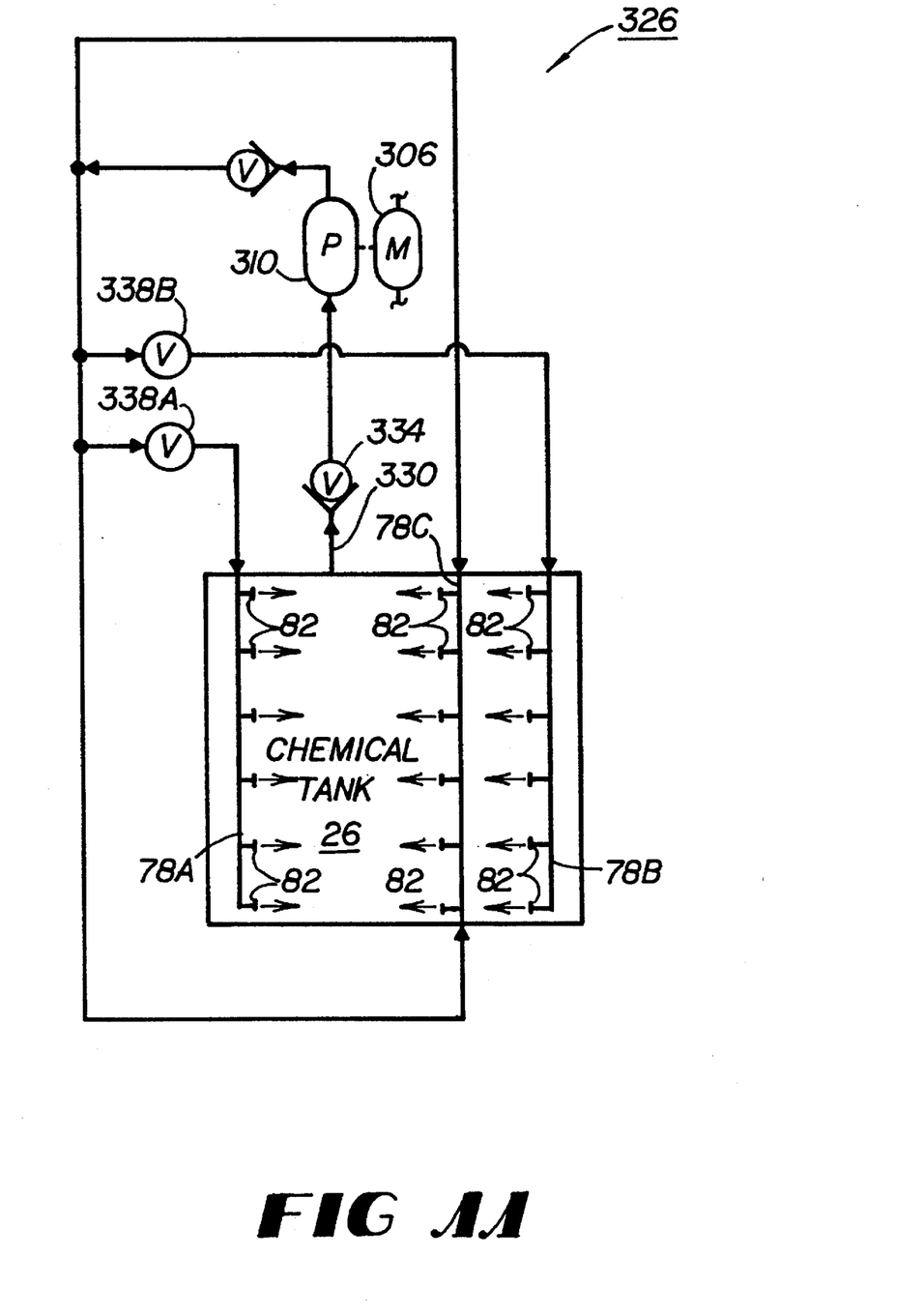
FIG. 11 is a schematic representation of the chemical agitation mechanism of the sprayer of FIG. 1.

The mechanism 326 for agitating chemicals 330 or other fluids within tank 26 is diagrammed in FIG. 11. Mushroom-shaped tank 26 includes three manifolds 78, one positioned on each of the left- and right-hand sides of the overhanging portion of the tank 26 (78A and 78B, respectively), and the other (78C) at the bottom of the tank 26. Chemicals 330 from tank 26 are circulated through agitation pump 310 and returned to tank 26, thereby agitating the chemicals 330.

As shown in FIG. 11, for example, chemicals 330 pass through check valve 334 and agitation pump 310, with one portion travelling through a solenoid-controlled or other valve 338A to manifold 78A and another portion advancing through a similar valve 338B to manifold 78B. The remaining chemicals 330 pass directly through to manifold 78C at the bottom of tank 26. Mechanism 326, consequently, provides unobstructed circulation of chemicals 330 to the bottom of tank 26 and thus causes continuous mixing to occur there. By contrast, chemicals 330 may be selectively prevented from circulating to upper manifolds 78A and 78B merely by closing valves 338A and 338B.

Figure 12:
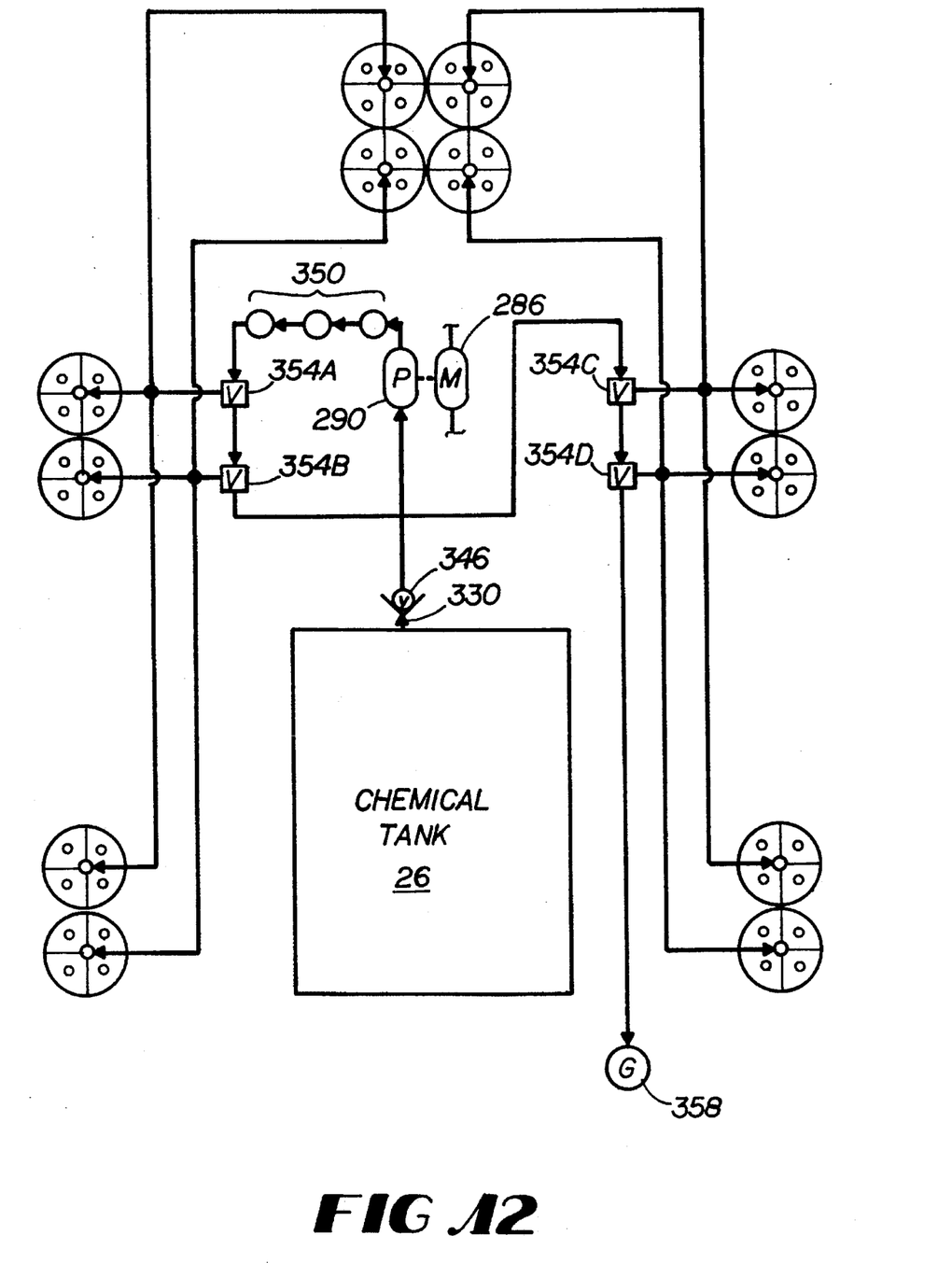
FIG. 12 is a schematic representation of the chemical metering mechanism of the sprayer of FIG. 1.

FIG. 12, finally, illustrates a mechanism 342 for metering chemicals 330 destined for cups 62. Shown in FIG. 12 are check valve 346, filter bank 350, and solenoid-controlled or other valves 354A–D interposed between metering pump 290 and cups 62. FIG. 12 also illustrates pressure gauge 358, which may be included to monitor the metering process.

Each of valves 354A–D controls one-fourth of nozzles 38. Opening valve 354A, for example, permits chemicals 330 to flow from tank 26 to the upper four nozzles 38 of the fore, middle, and aft banks 42, 46, and 50 on the right-hand side 230 of sprayer 10. Valve 354c similarly permits flow to the upper four nozzles of these banks 42, 46, and 50 on the left-hand side 226 of sprayer 10. Valves 354A and 354C thus typically remain open when spraying taller trees or vegetation with chemicals 330, as they control the uppermost nozzles 38 of sprayer 10. Valves 354B and 354D, by contrast, respectively control flow of chemicals 330 to the lower four nozzles 38 of the fore, middle, and aft banks 42, 46, and 50 on the right- and left-hand sides 230 and 226 of sprayer 10, and generally remain open when bushes or smaller trees or other vegetation are being sprayed. Spray from solely the left- or right-hand side 226 or 230 of sprayer 10 may also be obtained merely by closing either valves 354A and 354B or valves 354C and 354D, as when sprayer 10 encounters the boundary row of an orchard or grove. This selective control of the flow of chemicals 330 further enhances the efficiency of sprayer 10, reducing the quantity of chemicals used in the spraying process. Those skilled in the art will recognize that other combinations of open and closed conditions of valves 354A–D may be used to obtain different flows.

In at least one embodiment of sprayer 10, each nozzle 38 provides high velocity, low volume fluid travelling approximately 240 mph at 290 cfm. Impeller assembly 86 supplies low velocity and high volume air discharged at approximately 120 mph at 36,000 cfm. This embodiment of sprayer 10 is also designed to apply approximately 1–20 gallons of chemicals 330 per acre of vegetation and may be powered by a 250 hp Cummings diesel engine. Dimensions of this embodiment of sprayer 10 are:

| | |
|---|---|
| length | 19 ft 7 in |
| width | 5 ft 1 in |
| height | 5 ft 9 in | and its dry weight is approximately 6100 lbs. In this embodiment fuel tank 18 may hold 80 gallons of diesel fuel, and tank 26 may be configured to accommodate 300 gallons of chemicals 330 and made of 12 gauge stainless steel. Blower 34 may include an axial fan having a diameter of 38 in, and impeller assembly 86 may include a forward curve blade with a 15 in diameter. Various pumps associated with sprayer 10 may be of centrifugal type providing 30 psi at 80 gpm.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. Apparatus for spraying vegetation with fluid, the apparatus having a length and comprising:
   a. a frame;
   b. means for discharging a first fluid onto the vegetation at a first velocity and comprising:
      i. a first set of nozzles connected to the frame at a first location along the length; and
      ii. a second set of nozzles connected to the frame at a second location along the length spaced from the first location;
   c. means for thereafter discharging a second fluid onto the vegetation at a second velocity, which said second velocity is substantially less than the first velocity, and which said means for thereafter discharging said second fluid is connected to the frame at a third location spaced along the length from the first and second locations; and
   d. means for thereafter discharging said first fluid onto the vegetation at approximately the first velocity and comprising a third set of nozzles connected to the frame at a fourth location along the length spaced from the first, second, and third locations.

2. Apparatus according to claim 1 further comprising means for selectively occluding fluid flow to at least one nozzle of each of the first, second, and third sets of nozzles.

3. Apparatus according to claim 2 in which said first fluid comprises air and an agricultural chemical, further comprising:
   a. a tank adapted to contain the agricultural chemical;
   b. a cup in fluid communication with the tank and comprising:
      i. a bottom defining a plurality of openings; and
      ii. a plate connected to the bottom and dividing the bottom into a plurality of regions equal to the plurality of openings; and
   c. means for spraying the agricultural chemical into the cup in a substantially conical pattern and thereby depositing approximately uniform portions of the agricultural chemical in each of the plurality of regions.

4. Apparatus according to claim 3 having left and right sides and in which the first, second, and third sets of nozzles discharge said first fluid from both the left and right sides of the apparatus simultaneously.

5. Apparatus according to claim 4 in which each of the first, second, and third sets of nozzles is adjustable in a plurality of planes relative to the frame and independently of the other sets of nozzles.

6. Apparatus according to claim 5 further comprising means for agitating the agricultural chemical in the tank.

7. Apparatus according to claim 1 in which the means for thereafter discharging the second fluid comprises an impeller assembly.

8. Apparatus for spraying vegetation with fluid, comprising:
   a. a frame;
   b. an engine mounted to the frame;
   c. a power take-off shaft connected to the engine;
   d. an impeller assembly connected to the power take-off shaft and comprising:
      i. an impeller blade connected to the power take-off shaft, for discharging high volumes of air at low velocity;
      ii. a deflector baffle adjacent the impeller blade; and
      iii. a shroud covering at least a portion of the impeller blade;
   e. a blower coupled to the power take-off shaft and supplying pressurized air;
   f. bifurcated ductwork connected to the blower and defining a plurality of openings;
   g. a plurality of nozzles equal to the plurality of openings, each nozzle in fluid communication with one of the plurality of openings and adjustable in position independently of the others;
   h. a tank mounted to the frame and for containing an agricultural chemical;
   i. means for agitating the agricultural chemical contained in the tank;

j. a plurality of cups, in fluid communication with the tank and the plurality of nozzles, for metering the agricultural chemical and supplying it to the plurality of nozzles;

k. a reservoir mounted to the frame and for containing hydraulic fluid; and l. a pump in fluid communication with the reservoir, for pumping agricultural chemical from the tank to the plurality of cups.

* * * * *